United States Patent [19]
Coles et al.

[11] Patent Number: 5,996,945
[45] Date of Patent: Dec. 7, 1999

[54] HOSE CLAMP ASSEMBLY OFFSET MOUNTING CAPABILITY

[75] Inventors: Derry R. Coles, Kettering; Julian E. Evans, Leicester; Paul Fradgley, Spennymoor; Andrew M. Whitford, Grays; Craig D. Williams, Allestree, all of United Kingdom

[73] Assignee: Caterpillar Inc., Peoria, Ill.

[21] Appl. No.: 09/176,404

[22] Filed: Oct. 20, 1998

Related U.S. Application Data

[60] Provisional application No. 60/063,911, Oct. 31, 1997.

[51] Int. Cl.[6] ....................................................... F16L 3/00
[52] U.S. Cl. ........................ 248/68.1; 248/74.4; 24/16 R
[58] Field of Search ................................ 248/68.1, 67.5, 248/74.1, 74.4; 24/16 R, 284

[56] References Cited

U.S. PATENT DOCUMENTS

| | | | |
|---|---|---|---|
| 2,354,919 | 8/1944 | Lockwood | 248/68.1 |
| 4,148,113 | 4/1979 | Dvorachek | 24/16 R |
| 4,601,447 | 7/1986 | McFarland | 248/68.1 |
| 5,098,047 | 3/1992 | Plumley | 248/68.1 |
| 5,221,065 | 6/1993 | Siems et al. | 248/65 |

OTHER PUBLICATIONS

U.S. application No. 06/751,640, filed Jul. 3, 1985 "Clamping Arrangement".

*Primary Examiner*—Victor N. Sakran
*Attorney, Agent, or Firm*—Diana L. Charlton

[57] ABSTRACT

The present invention includes the utilization of support blocks with angular surfaces which define semi-circular notches therein so that when assembled the semi-circular notches are aligned to form substantially circular regions for supporting a plurality of hoses individually in an offset and spaced relationship from one another. The ability to utilize support blocks which are designed in such a manner provides a space efficient manner for holding the individual hoses, while simultaneously, protecting the hoses from damage.

6 Claims, 2 Drawing Sheets

*Fig. - 1 -*
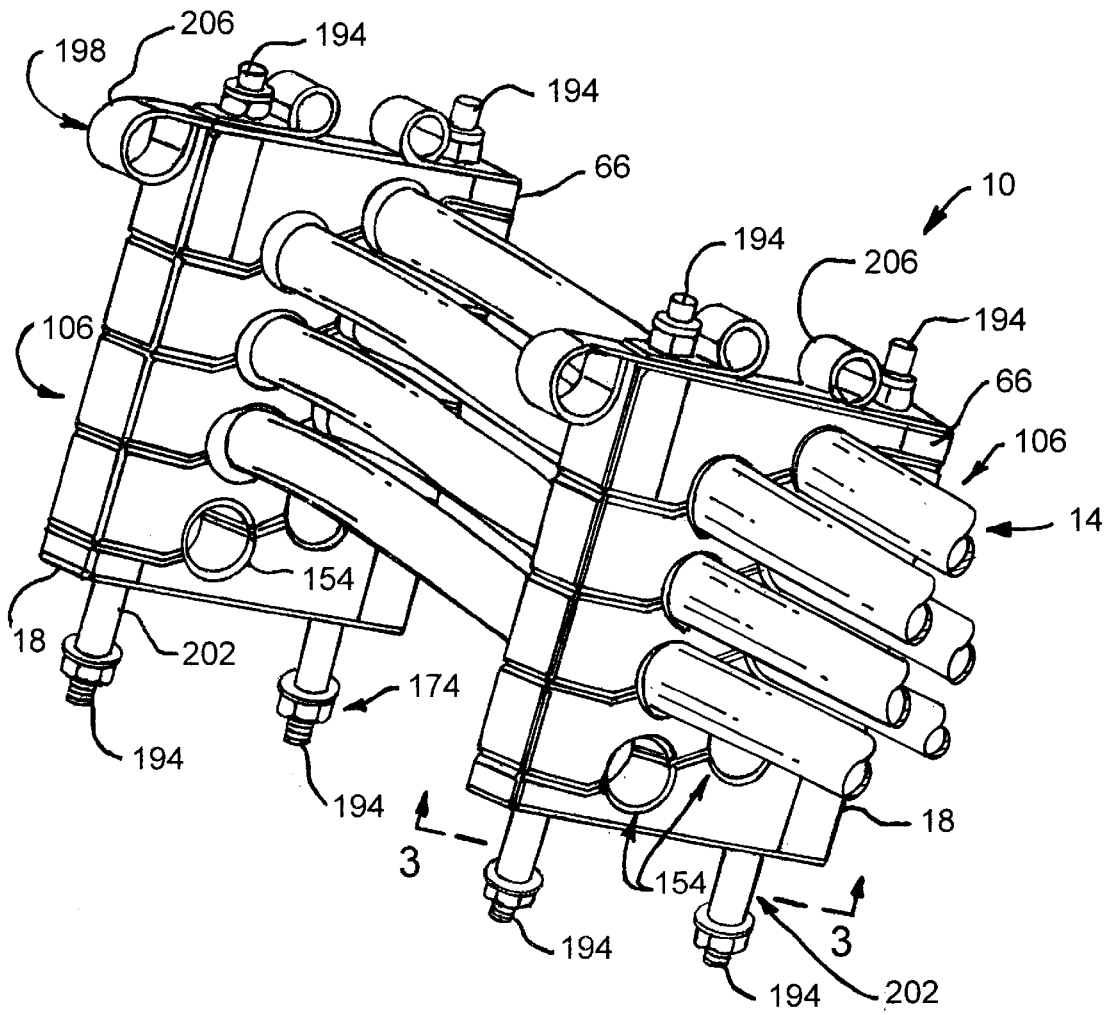
*Fig. - 3 -*
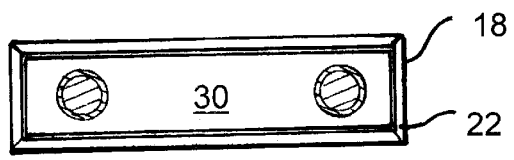

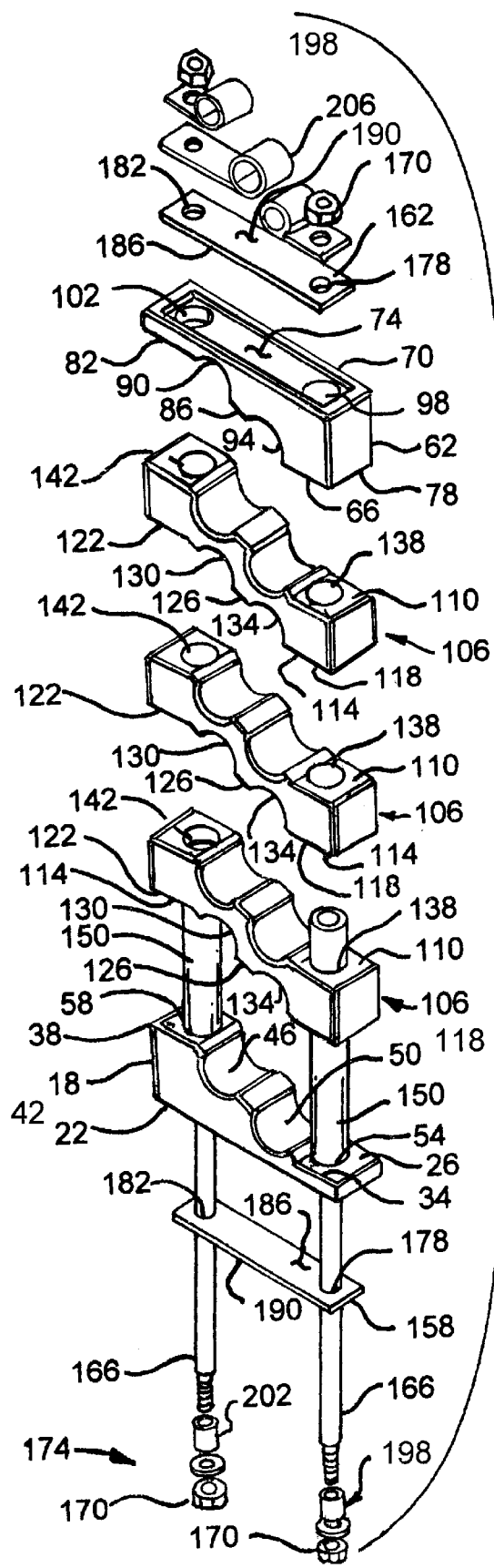
Fig. -2-

HOSE CLAMP ASSEMBLY OFFSET MOUNTING CAPABILITY

This application claims the benefit of prior provisional patent application Ser. No. 60/063,911 filed Oct. 31, 1997.

TECHNICAL FIELD

This invention relates generally to a clamp assembly for use in securing a plurality of hoses individually and more particularly to the offset spacing and stability of the individual hoses for increased space efficiency and protection of the individual hoses.

BACKGROUND ART

It is typically known that clamping devices are used for securing a high number of hoses or conduits on a wide variety of machines. Many such clamping devices allow adequate spacing for the hoses or conduits, either between the individual hoses or conduits themselves or from other adjacent components, to prevent damage to the hoses and conduits. One such clamping device includes a bent plate with a ladder construction capable of securing a plurality of hoses or conduits in a spaced and angled relationship to one another. The securing of the hose or conduit occurs through the use of a flexible fastener which is tightened around each hose at various rungs of the ladder.

In some instances, however, a clamping device is needed to secure individual hoses or conduits in an arrangement which is more space efficient and ensures higher protection from damage and instability. Therefore, it is important to utilize a clamp device which is easily manufactured and assembled and which can be adapted to hold a plurality of hoses or conduits with ease.

The present invention is directed to overcoming the problems as set forth above.

DISCLOSURE OF THE INVENTION

In one aspect of the present invention, a clamp assembly is adapted for holding individual ones of a plurality of hoses. The clamp assembly comprises bottom, top and at least one intermediate support blocks. The bottom support block has a lower surface, a substantially angled upper surface which defines at least one semi-circular notch therein and a pair of openings defined therethrough spaced from one another. The top support block has an upper surface, a substantially angled lower surface which defines at least one semi-circular notch therein and a pair of openings defined therethrough spaced from one another. The at least one intermediate support block has substantially angled upper and lower surfaces with each defining at least one semi-circular notch therein. The at least one intermediate support block is disposed between the top and bottom support blocks and is positioned therebetween and has a pair of openings defined therethrough spaced from one another. The clamp assembly further comprises a tubular connecting device and a securing mechanism. The tubular connecting device extends through each of the spaced pair of openings defined through each of the bottom, top and intermediate support blocks to align the semi-circular notch of the at least one intermediate support block with the respective semi-circular notches of the top and bottom support blocks to define a plurality of spaced substantially circular regions for supporting the plurality of hoses individually therein. The securing mechanism is operatively associated with each of the tubular connecting devices and the bottom and top support blocks to hold the bottom, top and intermediate support blocks together.

In another aspect of the present invention, a clamp assembly is adapted for holding individual ones of a plurality of hoses. The clamp assembly comprises bottom, top and at least one intermediate support blocks. The bottom support block has a lower surface, a substantially angled upper surface which defines a pair of semi-circular notches therein and a pair of openings defined therethrough spaced from one another. The top support block has an upper surface, a substantially angled lower surface which defines a pair of semi-circular notches therein and a pair of openings defined therethrough spaced from one another. The at least one intermediate support block has substantially angled upper and lower surfaces with each defining a pair of semi-circular notches therein. The at least one intermediate support block is disposed between the top and bottom support blocks and is positioned therebetween and has a pair of openings defined therethrough spaced from one another. The clamp assembly further comprises a tubular connecting device and a securing mechanism. The tubular connecting device extends through each of the spaced pair of openings defined through each of the bottom, top and intermediate support blocks to align the semi-circular notches of the at least one intermediate support block with the respective pair of semi-circular notches of the top and bottom support blocks to define a plurality of spaced and offset substantially circular regions for supporting the plurality of hoses individually therein. The securing mechanism is operatively associated with each of the tubular connecting devices and the bottom and top support blocks to hold the bottom, top and intermediate support blocks together.

The present invention includes the utilization of support blocks with angular surfaces which define semi-circular notches therein so that when assembled the semi-circular notches are aligned to form substantially circular regions for supporting a plurality of individual hoses which are offset and spaced from one another. The ability to utilize support blocks which are designed in such a manner provides a space efficient manner for holding the individual hoses, while simultaneously, protecting the hoses from damage and instability.

BRIEF DESCRIPTION OF THE DRAWINGS

FIG. 1 is an assembly view of a plurality of hoses mounted with the present invention;

FIG. 2 is an exploded view of the present invention; and

FIG. 3 is a partial view taken along line 3—3 on FIG. 1.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring to the drawings, it can be seen that a clamp assembly 10 is utilized to support a plurality of hoses 14 which are positioned independently in a spaced and offset relationship from one another. The clamp assembly 10 is made from any suitable type of material which has high durability, such as polyurethane for high friction and rigidity to resist axial and lateral movement, respectively, of the plurality of hoses 14. A bottom support block 18 with a substantially triangular shape has lower and upper surfaces 22,26 and a recessed mounting surface 30 which is defined inwardly from the lower surface 22. The upper surface 26 includes a pair of planar portions 34,38 and an angular portion 42 extending between the planar portions 34,38. A pair of spaced semi-circular notches 46,50 are formed along the angular portion 42. A pair of spaced openings 54,58 are defined through the bottom support block 18 with each one of the pair of openings 54,58 extending from the lower surface 22 through the respective planar portion 34,38. A top support block 62 with a substantially triangular shape has lower and upper surfaces 66,70 and a recessed mounting surface 74 which is defined inwardly from the upper surface 70. The lower surface 66 includes a pair of planar portions 78,82 and an angular portion 86 extending between the planar portions 78,82. A pair of spaced semi-circular notches 90,94 are formed along the angular portion 86. A pair of spaced openings 98,102 are defined through the top support block 62 with each one of the pair of openings 98,102 extending from the upper surface 70 through the respective planar portion 78,82. A plurality of intermediate support blocks 106 are disposed between the bottom and top support blocks 18,62 and have upper and lower surfaces 110,114. Each of the upper and lower surfaces 110,114 includes a pair of planar portions 118,122 and an angular portion 126 extending between the planar portions 118,122. A pair of spaced semi-circular notches 130,134 are formed along the angular portion 126 of each of the upper and lower surfaces 110,114. A pair of spaced openings 138,142 through each of the intermediate support blocks 106 with each one of the pair of openings 138,142 extending between the upper and lower surfaces 110,114 through the respective planar portion 118, 122. It should be understood that the number of intermediate support blocks 106 used may vary in order to accommodate different applications and functions.

A tube 150 extends through each of the pair of spaced openings 54,58,98,102,138,142, respectively, in the bottom, top and intermediate support blocks 18,62,106 to align the respective semi-circular notches 46,50,90,94,130,134 to define a plurality of substantially circular regions 154, shown more clearly in FIG. 1, in which the plurality of hoses 14 are individually supported. First and second plates 158, 162, a pair of threaded studs 166 and a plurality of nut and washer assemblies 170 define a securing mechanism 174 which is operatively associated with the tube 150 and the bottom and top support blocks 18,62 to hold the bottom, top and intermediate support blocks 18,62,106 together. The first and second plates 158,162 each have a pair of spaced holes 178,182 defined therethrough and inner and outer surfaces 186,190. The inner surfaces 186 of the first and second plates 158,162 are seated against the recessed mounting surfaces 30,74 of the bottom and top support blocks 18,62, respectively, adjacent opposed ends of the tubes 150 so that the outer surfaces 190 of the first and second plates 158,162 are substantially flush with the respective lower and upper surface 22,70 of the bottom and top support blocks 18,62 to substantially capture the first and second plates 158,162 within the respective bottom and top support blocks 18,62 and enclose the tubes 150 therebetween. One of the pair of threaded studs 166 extends through each of the tubes 150 and the respective pair of holes 178,182 in the first and second plates 158,162 so that end portions 194 thereof extend beyond the first and second plates 158,162. A spacer device 198 of any suitable type, such as a plurality of spacers 202 or clips 206, is disposed upon the end portions 194 of the threaded studs 166 dependent on the necessary usage of the clamp assembly 10. The nut and washer assembly 170 is threaded on the end portions 194 of the threaded studs 166 and tightened against the respective spacer device 198.

INDUSTRIAL APPLICABILITY

During assembly, the first and second plates 158,162 are positioned within the respective bottom and top support blocks 18,62 to resist any movement of the bottom, top and intermediate support blocks 18,62,106 and to provide substantially equal distribution of loading across the clamp assembly 10. The positioning of the semi-circular notches 46,50,90,94,130,134 on the angular surfaces 42,86,126 of the bottom, top and intermediate support blocks 18,62,106 provides for the spaced and offset substantially circular regions 154 which support the plurality of hoses 14 individually in a minimum amount of space. The centerlines of the semi-circular notches 46,50,90,94,130,134 are positioned offset beyond the respective angular surface 42,86, 126 thereof so that when the angular surfaces 42,86,126 are mated adjacent one another, the substantially circular regions 154 are not fully circular. The substantial circular shape of these regions 154 allows the gripping action on the plurality of hoses 14 to be due to the clamping force of the clamp assembly 10 from the fastening of the nut and washer assembly 170 on the threaded studs 166. The bottom, top and intermediate support blocks 18,62,106 provide increased stability and protection of the plurality of hoses 14 due to the durability of the material used and rigid structuring. The ability to add intermediate support blocks 106 dependent on the number of hoses 14 used increases the flexibility of the clamping assembly 10 to work in a wide range of applications.

Other aspects, objects and advantages of this invention can be obtained from a study of the drawings, disclosure and the appended claims.

We claim:

1. A clamp assembly adapted for holding individual ones of a plurality of hoses, the clamp assembly comprising:

a bottom support block having a lower surface, a substantially angled upper surface defining at least one semi-circular notch therein and a pair of openings defined therethrough spaced from one another;

a top support block having an upper surface, a substantially angled lower surface defining at least one semi-circular notch therein and a pair of openings defined therethrough spaced from one another;

at least one intermediate support block having substantially angled upper and lower surfaces with each defining at least one semi-circular notch therein, the at least one intermediate support block disposed between the top and bottom support blocks and positioned therebetween and having a pair of openings defined therethrough spaced from one another;

a tubular connecting device extending through each of the spaced pair of openings defined through each of the bottom, top and intermediate support blocks to align the semi-circular notches of the at least one intermediate support block with the respective semi-circular notches of the top and bottom support blocks to define a plurality of spaced substantially circular regions for supporting the plurality of hoses individually therein; and a securing mechanism operatively associated with each of the tubular connecting devices and the bottom and top support blocks to hold the bottom, top and intermediate support blocks together.

2. The clamp assembly of claim 1, wherein the securing mechanism includes first and second plates operatively associated with the respective lower and upper surfaces of the bottom and top support blocks with each of the first and second plates having a pair of spaced holes defined therethrough, a stud having threaded end portions extending through each of the tubular connecting devices and the pair of holes in the first and second plates and a nut threaded on each of the threaded end portions of the pair of studs and tightened against the respective first and second plates.

3. The clamp assembly of claim 2, wherein the bottom and top support blocks each have a recessed mounting surface extending from the respective lower and upper surfaces thereof and the first and second plates each have an outer surface, the first and second plates being seated against the respective recessed mounting surfaces of the bottom and top support blocks so that the outer surfaces of the first and second plates are flush with the respective lower and upper surface of the bottom and top support blocks.

4. The clamp assembly of claim 3, wherein each of the pair of openings in the bottom, top and intermediate support blocks and each of the pair of holes in the first and second plates have a predetermined diameter and each of the tubular connecting devices are disposed between the first and second plates and have a predetermined diameter less than the predetermined diameter of each of the pair of openings in the bottom, top and intermediate support blocks and greater than the predetermined diameter of each of the pair of holes in the first and second plates.

5. The clamp assembly of claim 2, including a spacer device disposed on each of the threaded studs and located between the first and second plates and the respective nut.

6. A clamp assembly adapted for holding individual ones of a plurality of hoses, the clamp assembly comprising:
   a bottom support block having a lower surface, a substantially angled upper surface defining a pair of semi-circular notches therein and a pair of openings defined therethrough spaced from one another;
   a top support block having an upper surface, a substantially angled lower surface defining a pair of semi-circular notches therein and a pair of openings defined therethrough spaced from one another;
   at least one intermediate support block having substantially angled upper and lower surfaces with each defining a pair of semi-circular notches therein, the at least one intermediate support block disposed between the top and bottom support blocks and positioned therebetween and having a pair of openings defined therethrough spaced from one another;
   a tubular connecting device extending through each of the spaced pair of openings defined through each of the bottom, top and intermediate support blocks to align the semi-circular notches of the at least one intermediate support block with the respective pair of semi-circular notches of the top and bottom support blocks to define a plurality of spaced and offset substantially circular regions for supporting the plurality of hoses individually therein; and
   a securing mechanism operatively associated with each of the tubular connecting devices and the bottom and top support blocks to hold the bottom, top and intermediate support blocks together.

\* \* \* \* \*

UNITED STATES PATENT AND TRADEMARK OFFICE
CERTIFICATE OF CORRECTION

PATENT NO. : 5,996,945
DATED : December 7, 1999
INVENTOR(S) : Coles et al.

It is certified that error appears in the above-identified patent and that said Letters Patent is hereby corrected as shown below:

ON THE TITLE PAGE:
Item 54: TITLE

In the title, after "Assembly", insert --With--

Signed and Sealed this

Twenty-first Day of November, 2000

Attest:

Q. TODD DICKINSON

Attesting Officer

Director of Patents and Trademarks